United States Patent [19]

Stoll et al.

[11] Patent Number: 4,759,265

[45] Date of Patent: Jul. 26, 1988

[54] PISTON AND CYLINDER UNIT

[76] Inventors: Kurt Stoll; Gerhard Hihn, both of Lenzhalde 72, 7300 Esslingen, Fed. Rep. of Germany

[21] Appl. No.: 43,944

[22] Filed: Apr. 29, 1987

[30] Foreign Application Priority Data

May 17, 1986 [DE] Fed. Rep. of Germany ....... 3616844

[51] Int. Cl.$^4$ .................. F01B 31/10; B61F 15/22; F16J 9/08
[52] U.S. Cl. ........................ 92/153; 92/152; 92/168; 277/212 C; 277/212 F; 277/24
[58] Field of Search .............. 92/152, 153, 168; 277/165, 212 C, 212 F, 212 R, 206 R, 24; 60/527

[56] References Cited

U.S. PATENT DOCUMENTS

| 2,595,878 | 5/1952 | Parsons | 92/153 |
| 3,070,070 | 12/1962 | Trevor | 92/168 |
| 3,175,474 | 3/1965 | Eickmann | 92/168 |
| 3,308,668 | 3/1967 | Wong | 60/527 |
| 4,076,103 | 2/1978 | Wallis | 92/153 |
| 4,401,307 | 8/1983 | Dechavanne | 277/165 |
| 4,441,317 | 4/1984 | Wolf et al. | 92/153 |

FOREIGN PATENT DOCUMENTS

| 629718 | 1/1934 | Fed. Rep. of Germany | 277/59 |
| 731567 | 2/1932 | France | 277/59 |
| 241850 | 1/1968 | U.S.S.R. | 277/59 |

Primary Examiner—Robert E. Garrett
Assistant Examiner—Thomas E. Denion
Attorney, Agent, or Firm—McGlew and Tuttle

[57] ABSTRACT

The invention provides a piston and cylinder unit whose piston rod is sealed by a supporting and sealing arrangement arranged in an end cap of the unit. This supporting and sealing arrangement comprises a sealing portion made integrally with a stripper portion and joined therewith to form a sleeve-like sealing member surrounding the piston rod having the said portions at its ends. A lubricant-permeable supporting bushing encompassing the piston rod is mounted in the sealing member between the sealing and stripper portions and receives lubricant from lubricant reservoirs in the part of the sealing member between the stripper and sealing portions.

20 Claims, 2 Drawing Sheets

PISTON AND CYLINDER UNIT

BACKGROUND OF THE INVENTION

The invention relates to piston and cylinder units of the type comprising a cylinder, an axially moving piston in the cylinder, a piston rod attached to the piston and extending out of the cylinder to at least one side of the piston through a supporting and sealing arrangement which coaxially completely surrounds the piston rod and is detachably connected to the cylinder. At its end nearest the interior of the cylinder this supporting and sealing arrangement has an annular sealing section, an annular stripper section axially spaced from the sealing section so as to be further away from the interior of the cylinder, and a piston rod support bushing axially between these two sections.

The purposes of such a supporting and sealing arrangement is to seal off the inside of the cylinder from the exterior, to prevent foreign matter working its way into the interior of the cylinder and to ensure accurate running, with a minimum degree of wear, of the piston rod where it extends through the cylinder wall. Such supporting and sealing arrangements as so far proposed have been made up of separate parts, one for performing each of the different functions. There is thus firstly a sealing ring having a sealing portion in the form of a sealing lip surrounding the piston rod and serving to provide the internal sealing function of the cylinder. Following this sealing ring on the outer side thereof there is then a support bushing which is in turn followed by a stripper ring with an annular stripping portion to strip dirt, dust and the like from the outer surface of the piston rod. These components are together mounted with a press fit in a cylindrical socket in the cylinder and they coaxially surround the piston rod.

A shortcoming with such a supporting and sealing arrangement as used in the prior art is firstly the slowness of assembly, which is due to the large number of individual parts. Furthermore dismounting the parts as necessary after wear has taken place is awkward, since the separate parts are tightly jammed in the cylinder and are difficult to dislodge. It is practically impossible to replace the parts without damage so that even if only the sealing ring has become worn or damaged, the two other sections of the supporting and sealing arrangement will have to be replaced as well and this increases costs. A further point is that owing to the direct longitudinal sliding of two metal parts the supporting and sealing arrangement is very prone to wear so that replacement of the support bushing is frequently called for. A further cause of wear is that the supporting bushing is rigidly mounted in the cylinder so that any inaccuracy in manufacture as regards the coaxial alignment of the support bushing and the piston rod will be compensated for by wear.

SHORT SUMMARY OF THE INVENTION

Accordingly one object of the present invention is to devise a piston and cylinder unit of the type initially described whose supporting and sealing arrangement is simple and cheap to produce.

A further aim of the invention is to provide such a supporting and sealing arrangement which may be readily fitted and readily removed and has an enhanced working life.

In order to achieve these or other objects of the invention appearing herein the sealing and the stripper portions are integrally manufactured and form parts of a sleeve-like sealing member which surrounds the piston rod and is secured on the cylinder so that it may be readily detached, the sealing and the stripper portions being located on the opposite end parts of this sealing member. Furthermore the sealing member simultaneously constitutes a holder for the support bushing which is secured on the inner side, facing the piston rod, of the sealing member, and the sealing member comprises at least one lubricant reservoir, which communicates with the outer circumferential surface, or at least a segment thereof, of the support bushing which is designed so as to be permeable to the lubricant at least in a radial direction.

Due to the reduction in the number of components in the supporting and sealing arrangement, manufacture may proceed more rapidly and cheaply. Furthermore assembly and dismounting of the arrangement are considerably facilitated inasfar as the supporting and sealing arrangement in accordance with the invention may be manipulated as a single unit and is more or less in the form of a single component. The essential advantage is however that wear of the supporting bushing and of the piston rod cooperating therewith may be considerably reduced by the configuration of the invention. For prior to assembly of the sealing member it is possible for each of its lubricant reservoirs to be filled, for example with grease, and such lubricant is then able in later use to permeate the supporting bushing generally in a radial direction so that it arrives at the interface between the supporting bushing and the piston rod. It is here that a lubricant film will be produced which makes possible low-wear if not wear free sliding engagement of the piston rod in the supporting bushing. If after a prolonged period of running the lubricant reservoirs should have discharged, the supporting and sealing arrangement, which is able to be readily detached from the cylinder, may be removed in a simple operation and refilled with the lubricant. A further point is that the supporting bushing, which is located at the inner periphery of the sealing member inside same, may be advantageously manufactured largely of soft plastics material and is yieldingly and elastically mounted so that it may allow for any lack of accuracy in manufacture as regards the axial alignment of the piston rod without involving heavy wear. The supporting bushing is mounted in a more or less floating manner. This means that one may be certain of a good sealing and stripping action and furthermore a highly elastic positioning of the supporting bushing in the sealing member. Even lubrication of the points of contact between the supporting bushing and the piston rod may also be ensured, since by providing a large pore density there will be a large number of lubricant exit ports opening onto the piston rod. Furthermore the supporting bushing may be simply manufactured without it be necessary to make any openings in it later.

Advantageous further features of the invention will be seen from the claims.

In accordance with one possible further feature of the invention there is at least one annular space extending along the outer circumference of the supporting bushing whose circumferential wall facing inwards towards the piston rod is formed by the outer surface or a part of the outer surface of the supporting bushing, such space being in communication with the lubricant reservoir or forming such reservoir.

This feature ensures an even distribution of the lubricant around the outer circumference of the supporting bushing so that the piston rod is wetted by the lubricant after making its way through the supporting bushing.

In accordance with further features of the invention the circumferential and axial walls of the lubricant reservoir are formed by the limiting walls of interruptions, which extend fully through the sealing member in a generally radial direction and open at one end at the outer circumference and at the other end at the inner circumference of the sealing member. On their outer face opposite to the supporting bushing the lubricant reservoirs may be covered and shut off by a covering surface on the cylinder side, such covering surface being formed by the inner circumferential surface of a cylindrical holding socket adjacent to the passage in the cylinder wall for the piston rod, for holding the supporting and sealing arrangement.

A supporting and sealing arrangement with these features is particularly simple to manufacture and when the sealing member is not fitted, it is very easy to provide with lubricant.

The interruptions may be in the form of parallel slots aligned with the longitudinal direction of the piston This feature means that the supporting bushing is intensively provided with lubricant at its circumference and along its full length.

The supporting bushing may be in the form of an inlay part in the sealing member, that is preferably made of plastics material, such inlay part or incast part having a circularly cylindrical outer circumference.

Furthermore the supporting and sealing arrangement may be in the form of a single unit.

These further developments of the invention relate to advantageous forms of the supporting and sealing arrangement which then consists of two single parts firmly joined together so that the result is a single component which may readily be manipulated. During production the supporting bushing preferably has the plastics material of the sealing member injection molded around it.

The supporting and sealing arrangement in accordance with the invention may be so designed that the sealing member has a portion with a reduced diameter, i.e. with a diameter less than the part having the reservoirs, in the end part adjacent to the sealing so that an annular shoulder is present which, after insertion in the retaining socket in the cylinder, abuts an opposing annular shoulder reducing the cross section of the socket in order to limit the depth to which the sealing member may be inserted into the socket, the retaining socket having for example a cylindrical section of greater diameter and a cylindrical section adjacent to the opposing annular shoulder with a lesser diameter.

These features simplify the fitting of the supporting and sealing arrangement of the invention without any danger of damage to the sealing ring since the depth of insertion is limited by the presence of the annular shoulder in the cylinder.

A more detailed account of the invention will now be provided with reference to the accompanying drawings.

LIST OF THE SEVERAL VIEWS OF THE DRAWINGS

DETAILED ACCOUNT OF THE INVENTION

Figure 1:
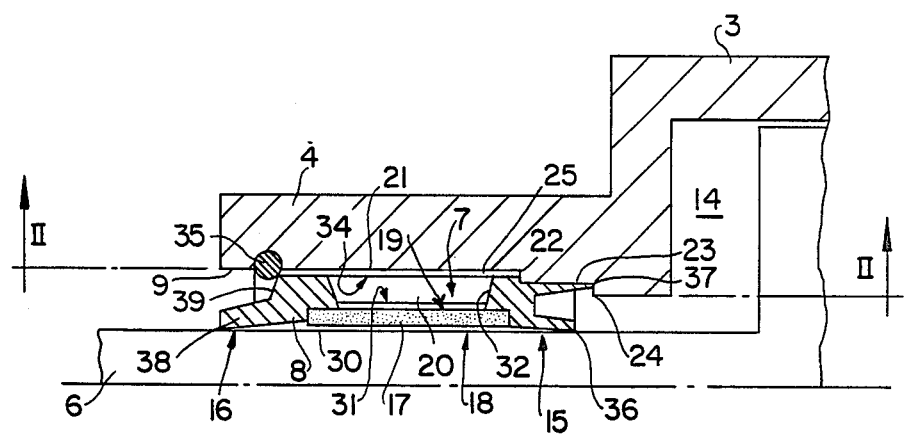
FIG. 1 shows one embodiment of the piston and cylinder unit in accord with the invention with the part in which the piston rod extends through the cylinder wall shown on a larger scale than the rest of the figure, the view being a section taken on the line I—I of FIG. 2.
Figure 2:
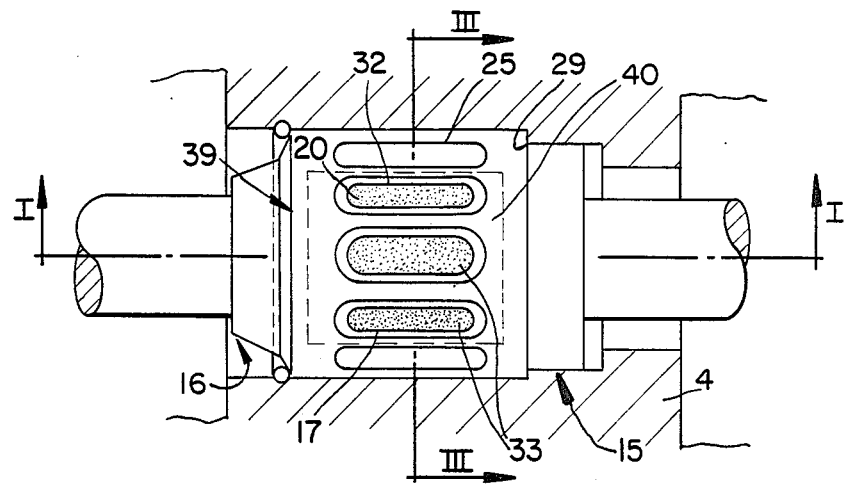
FIG. 2 is a cut away elevation of the supporting and sealing arrangement of FIG. 1 sectioned on the line II—II of FIG. 1.
Figure 3:
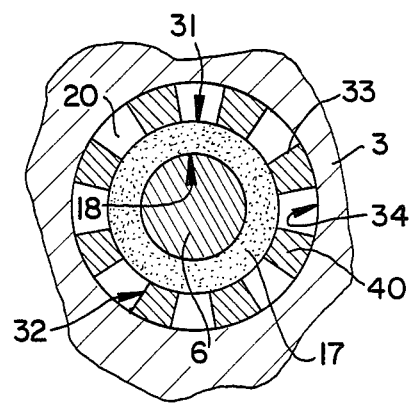
FIG. 3 is a cross section of the piston and cylinder unit in accordance with the invention taken on the line III—III of FIG. 2.

The figures are of parts of a piston and cylinder unit showing the end part of a cylinder 3 which in the present case is closed by a cylinder end cap 4. A piston 5 is mounted coaxially on a piston rod 6 in the cylinder 3, the piston rod running in the longitudinal direction of the cylinder 3 and extending through the cylinder end cap 4 to the outside. At the position where the piston rod extends through the end cap, which is to be given consideration here, there is a supporting and sealing arrangement 7 for supporting and sealing off the piston rod 6 in relation to the cylinder 3.

The supporting and sealing arrangement 7 comprises a generally sleeve-like sealing member 8 preferably fashioned of plastics or a material with rubber-like properties. This member is mounted in a cylindrical retaining socket 9 which extends through the cylinder end cap 4 in the axial direction and for its part has the piston rod 6 extending through it with a radial distance between them. At its axial end part nearer the interior 14 of the cylinder the sealing member 8 has a sealing portion 15 and at its opposite end part, nearer the outside, the sealing member has a stripper portion 16; the two portions coaxially surround the piston rod 6 and are arranged with an axial distance between them. The purpose of the sealing portion 15 is to ensure that the interior 14 of the cylinder is sealed off from the surroundings in a gas-tight manner and the purpose of the stripper portion 16 is to clear any dirt particles or the like adhering to the outer face of the piston rod 6 outside the cylinder as the piston rod moves into the cylinder.

In addition to its sealing function the sealing member 8 serves to locate and secure the arrangement since it has a support bushing 17, also forming part of the supporting and sealing arrangement 7, held against its inner face turned towards the piston rod 6. By means of this bushing 17 the piston rod 6 is slidingly supported in relation to the cylinder 3 where the piston rod extends through the end cap. The supporting bushing 17 has its inner circumferential face 18 in sliding engagement with the outer face of the piston rod 6 and is practically immovably axially located in relation to the cylinder 3 by means of the sealing member 8, which is detachably secured to the cylinder end cap 4.

The supporting bushing 17 is of a design that is permeable to lubricant and its outer circumferential surface 19, or a part of such surface, is in constant communication with at least one, and in the present case eight, lubricant reservoirs 20 which are provided in the sealing member 8. The reservoirs are able to be filled with a lubricant, more especially in the form of grease, which during the operation of the piston and cylinder unit will be able to penetrate the permeable support bushing 17, generally in a radial direction, towards the piston rod 6 and will be evenly distributed at the inner circumferential surface 18 of the supporting bushing 17 with the formation of a lubricating film. The supporting bushing 17 and the piston rod 6 thus form a lubricated combination of bearing elements which is characterized by a very low degree of wear since lubricant is continuously supplied.

The retaining socket 9 in the cylinder end cap 4 has a number of steps or shoulders therein. It is made up of an outer first long cylindrical section 21, which comes to an end at an annular shoulder 22 separating it from a shorter cylindrical section 23 with a somewhat smaller diameter. This section 23 then ends at an annular shoulder 24 separating it from the interior 14 of the cylinder.

Accordingly, in the opening in the cylinder end cap 4 the piston rod 6 is within a shouldered or stepped annular space Between its sealing portion 15 and its stripper portion 16 the sealing member 8 has a tubular central portion 25 with a circularly cylindrical outer circumference whose diameter is essentially equal to the diameter of the cylindrical section 21. The transition from the central portion 25 to the sealing portion 15 is in the form of an annular step or shoulder 29 which is designed so as to be complementary to the annular shoulder 22 and in the inserted condition of the suppoting and sealing arrangement it comes into engagement with this annular shoulder 22 in order to limit the depth of insertion.

In the present working example of the invention the lubricant reservoirs are located in the just mentioned central portion 25, whose length is essentially the same as that of the supporting bushing 17, which is coaxially surrounded by the central portion 25. The reservoirs 20 are arranged with a distribution in the circumferential direction of the central portion 25 and their walls 31 facing the piston rod 6 are formed by the outer face 19 of the supporting bushing 17 so that the lubricant in the reservoirs is in direct contact with the supporting bushing 17. The walls facing in the axial and circumferential directions of the lubricant reservoirs 20 are formed by the limiting walls 32 or radial interruptions 33, which extend all the way through the sealing member in the radial direction and open at one end at its inner periphery in contact with the supporting bushing 17 and at the other end open at the outer circumference of the central portion 25. In the fitted condition of the supporting and sealing arrangement 7, as illustrated in the figures, each of the radially outer reservoir walls of the individual lubricant reservoirs 20 is shut off by a covering surface 34 on the cylinder side which is formed by the limit of the cylindrical socket section 21.

The interruptions 33 are designed in the form of slots, which are parallel to each other so as to be side by side in the circumferential direction and their length is somewhat less than the length of the supporting bushing 17 so as to be certain that the lubricant may only flow onto the outer circumferential surface of the supporting bushing.

In the present working example of the invention the sealing member 8 is entirely manufactured of plastics material with rubber-like properties and the supporting bushing 17 is seated in a circumferential groove 30 which is made in the central portion 25 in the inner circumferential surface of the sealing member 8. The supporting bushing 17 may in this respect be locked in the circumferential groove 30 but it preferably forms a so-called inlay or incast part which has the plastics material of the sealing member 8 molded around it during the production of the overall arrangement. In this case the supporting bushing 17 is embedded in the sealing member 8 and together forms therewith a single component which is to be fitted and removed as a single part which is accordingly readily manipulated.

The supporting and sealing arrangement in accordance with the invention is mounted with a running fit or with a slight interference fit in the retaining socket and may be readily inserted into and pulled out of the latter. This is an advantage when it comes to refilling the lubricant reservoirs 20 after the lubricant in them has been used up. To do this all that is necessary is for the supporting as sealing arrangement 7 to be retracted from the retaining socket 9 so that the reservoirs are at once accessible and able to filled up to their brims with relatively thick lubricant. After such refilling, the arrangement is pushed back into the socket 9 till the two annular shoulders 22 and 29 abut with each other, the reservoirs then being shut off at the same time by the wall of the socket.

The axial location of the supporting and sealing arrangement 7 is by means of a locking part 35 which holds the sealing member 8 so that it may not be moved. The locking part 35 in the present working example is a resilient wire ring placed in a circumferential groove in the outer end part of the socket. Part of the ring extends radially inwards into the socket 9 so as to form a stop for the sealing member 8, which is axially locked between the locking part 35 and the annular shoulder 22.

In order to endow the supporting bushing 17 with lubricant-permeable properties it is provided with a large number of holes extending through it which connect the lubricant reservoirs 20, that is to say the parts adjacent to the interruptions 33, with the inner circumferential surface 18 of the supporting bushing 17 so that the lubricant is able to make its way through the holes. The through holes may be drilled but it is preferred that they be in the form of pores in the material as in the fact the case in the embodiment. For this purpose the supporting bushing 17 consists of a porous material, i.e. frit. It has be found to be particularly advantageous if fritted bronze is used which on the one hand has a high degree of porosity and on the other has a low wear rate. The use of a porous material has the advantage over a material with separate holes that there is practically even supply of lubricant over the entire inner circumference of the supporting bushing 17, whereas in the case of separate holes the supply of lubricant would be local.

The sealing member employed in the embodiment of the invention has a particularly advantageous configuration. In fact, in the part with the sealing portion 15 there are two mutually coaxial lips 36 and 37 of which one lip 36 forms a sealing lip running from the axial end part of the central portion 25 obliquely towards the interior of the cylinder and to the piston rod 6. Thus it has the form of the surface of the frustum of a cone. The second lip 37 encompasses the sealing lip 36 with radial play and also extends from a part adjacent to the central portion 25 towards the interior 14 of the cylinder. It practically forms a tubular edge or rim which starts at the annular shoulder 29 and has its outer face engaging the wall of the socket section 23. As seen in cross section, the sealing portion 15 thus has a U- or V-like radial section, the sealing lip 36 making sealing contact with the piston rod 6 and the lip 37 making sealing contact with the cylinder end cap 4.

The stripper portion 16 consists essentially of s single stripper lip 38 which extends from the facing end part of the central portion 25 towards the piston rod 6 surrounding same. The transisitional section of the stripper lip 38 running towards the central portion 25 is stepped at the shoulder 39 and this shoulder cooperates with the locking part 35 in locating the supporting and sealing arrangement.

It will be seen from this that the sealing member 8 may be considered to be made up of a stripper ring having the stripper portion 16 and a sealing ring comprising the sealing portion 15, the two rings being coaxially arranged in relation to each other with an axial spacing therebetween. They are connected together integrally by circumferentially spaced ribs 40 extending in the length direction of the cylinder. The spaces between the ribs and the two rings constitute the lubricant reservoirs.

It is also to be observed that there is some axial play between the free axial end part of the lip 37 and the annular shoulder 24 opposite to it on the cylinder end cap 4 so that on the one hand the lip 37 will not be damaged and on the other hand it is possible for air to find its way in from the interior of the cylinder in order to press the lip 37 against the wall section 23 and make enhanced sealing contact therewith.

From FIG. 1 more especially the reader will readily be able to see a further advantage of the supporting and sealing arrangement of the invention. The supporting bushing 17 is connected with the cylinder 3 by the sealing member 8 in an elastic, yielding manner so that it may readily allow for the position of the piston rod 6, more particularly so that its own longitudinal axis coincides with that of the piston rod. This gives rise to a secure and precise supporting action with minimum wear.

At this juncture some details may be given of a further working example of the invention, not illustrated, in which there is an annular space extending along the outer circumference of the supporting bushing, such space being made either in the supporting bushing 17 or in the sealing member, or in both of them together. The circumferential wall of this space facing inwards towards the piston rod is formed by the outer face of the supporting sleeve. This annular space is directly connected with a lubricant reservoir or itself forms such reservoir so that the supporting bushing is evenly smeared with lubricant over its entire outer circumference. In this form of the invention it is especially advantageous to form a lubricant channel in the wall of the cylinder end cap to be in communication with the annular space and with a grease nipple so that lubrication is directly possible without removing the supporting and sealing arrangement.

What is claimed is:

1. A piston and cylinder unit comprising:
    a cylinder having an end cap the end cap forming an end wall and a tubular portion coaxial with said cylinder;
    a piston positioned within said cylinder and movable in said cylinder while making sealing contact with an inner face of said clyinder said piston cylinder and end cap defining a working chamber;
    a piston rod connected to said piston and extending through said working chamber and out of said cylinder through the tubular portion of said end cap;
    a supporting and sealing unit positioned within said tubular portion and removable from said tubular portion as a single unit, including
        a sealing member having an annular sealing portion adapted to surround said piston rod adjacent said piston, an annular stripper portion axially spaced from said sealing portion on a side of said sealing portion away from said piston and a plurality of circumferentially spaced ribs joining said sealing portion and said stipper portion,
        a piston supporting bushing arranged so as to be retained with respect to said sealing member axially between said sealing and stripper portions, the sealing and stripper portions acting as retension holders, and radially between said circumferentially spaced ribs and said piston rod,
        at least one lubricant reservoir between said annular sealing portion and said annular stripper portion and between said circumferentially spaced ribs, said reservoir opening onto at least a part of an outer circumferential surface of the supporting bushing, said supporting bushing being permeable to lubricant at least in a radial direction.

2. The piston and cylinder unit as claimed in claim 1 wherein said supporting backing member is fashioned of plastics material, said sealing member being located in an inwardly opening circumferential groove in said sealing member, said sealing member having a plurality of through holes for passage of such lubricant therethrough, a plurality of such reservoirs being provided which are circumferentially spaced in said sealing member, said reservoirs opening at least partially at radially inner ends thereof onto the outer circumferential surface of the supporting bushing.

3. The piston and cylinder unit as claimed in claim 1 wherein said supporting bushing is manufactured of fritted material having pores which allow passage of said lubricant through said supporting bushing in a radially inward direction from said at least one reservoir onto said piston rod.

4. The piston and cylinder unit as claimed in claim 1 wherein at least one annular space extends along the outer circumferential face of the supporting bushing, such space having an inwardly facing circumferential wall surface directed towards said piston rod, such wall being constituted by at least one part of the outer face of the supporting bushing, such space furthermore being in communication with the at least one reservoir or forming same.

5. The piston and cylinder unit as claimed in claim 1 wherein: said circumferentially spaced ribs extend axially between said stripper and sealing portions so as to form a circumferential wall and an axial wall for said at least one reservoir such at least one reservoir opening at the outer surface and inner surface of said sealing member.

6. The piston and cylinder unit as claimed in claim 3 wherein said at least one reservoir has its radially outer end remote from the supporting bushing covered over and sealed by a covering surface.

7. The piston and cylinder unit as claimed in claim 4 wherein covering surface is formed on said cylinder tubular portion in a retaining socket therein to receive said supporting and sealing arrangement.

8. The piston and cylinder unit as claimed in claim 1 wherein said sealing member comprises a stripper ring having said stripper portion thereon and further comprises a sealing ring having said sealing portion, said stripper and sealing rings being integrally joined together by said circumferentially spaced ribs extending in the direction of motion of the piston, there being a plurality of said at least one reservoirs each being located between two circumferentially spaced ribs.

9. The piston and cylinder unit as claimed in claim 1 wherein said sealing member is a member molded around said supporting bushing.

10. The piston and cylinder unit as claimed in claim 9 wherein said supporting bushing is incast in said sealing member and has a circularly cylindrical outer face at least where it is adjacent to said sealing member.

11. The piston and cylinder unit as claimed in claim 1 wherein said supporting and sealing arrangement is a single component.

12. The piston and cylinder unit as claimed in claim 7 wherein said retaining socket is in the form of an annular space around said piston rod and in which said sealing member and the supporting bushing are axially inserted and locked axially in place.

13. The piston and cylinder unit as claimed in claim 12 comprising a resilient wire ring for locking said supporting and sealing arrangement in said socket.

14. The piston and cylinder unit as claimed in claim 12 wherein said sealing member has an inner axial first end part with said sealing portion fitting in an inner part of said socket, this first end part having a smaller external diameter than a further part of the sealing member with said at least one reservoir therein and being separated therefrom by an annular shoulder which abuts an outwardly facing shoulder in the wall of said socket to limit the depth of insertion of said sealing member into said socket.

15. The piston and cylinder unit as claimed in claim 14 wherein said socket has outer cylindrical part in addition to said inner part thereof which is also cylindrical.

16. The piston and cylinder unit as claimed in claim 14 wherein said inner end part of said sealing member has the form of a tubular rim coaxially encompassing the piston rod and having a free end face spaced from an axially opposite radial wall of said cylinder and further having an outer face making contact with the wall of said inner socket part.

17. The piston and cylinder unit as claimed in claim 1 wherein said sealing portion and said stripper portion respectively comprise lips extending in opposite axial directions away from each other from said supporting bushing to make sealing and, respectively, stripping contact with said piston rod.

18. The piston and cylinder unit as claimed in claim 17 wherein said sealing portion comprises two sealing lip sections placed coaxially around each other.

19. A piston and cylinder unit comprising:
a cylinder having an end cap the end cap forming an end wall and a tubular portion coaxial with said cylinder, a shoulder portion being formed between said tubular portion and said cylinder;
a piston positioned within said cylinder and movable in said cylinder making sealing contact with an inner face of said cylinder, said piston cylinder and end cap defining a working chamber;
a piston rod connected to said piston and extending through said working chamber and out of said cylinder through the tubular portion of said end cap, said tubular portion having a circumferential groove spaced from said shoulder portion;
a supporting and sealing unit positionable within said tubular portion and removable from said tubular portion as a single unit, including
a sealing member having an annular sealing portion adapted to surround said piston rod adjacent said cylinder, an annular stripper portion axially spaced from said sealing portion on a side of said sealing portion away from said cylinder and a plurality of circumferentially spaced ribs joining said sealing portion and said stripper portion,
a piston supporting bushing arranged so as to be retained with respect to said sealing member, axially between said sealing and stripper portions which act as retention holders, and radially between said circumferentially spaced ribs and said piston rod,
at least one lubricant reservoir between said sealing portion and said stripper portion and between said circumferentially spaced ribs, said reservoir opening onto at least a part of an outer circumferential surface of the supporting bushing, said supporting bushing being permeable to lubricant at least in a radial direction; and,
retention means engageable with said circumferential groove in said tubular portion for retaining said supporting and sealing unit in said tubular portion between said shoulder portion and said retaining means, said retaining means being disengageable so as to remove said supporting and sealing unit as a single unit.

20. A piston and cylinder unit comprising:
a cylinder having an end cap the end cap forming an end wall and a tubular portion coaxial with said cylinder;
a piston positioned within said cylinder and movable in said cylinder while making sealing contact with an inner face of said cylinder, said piston cylinder and end cap defining a working chamber, said end cap having a shoulder portion protruding between said tubular portion and said cylinder, said tubular portion having a circumferential groove;
a piston rod connected to said piston and extending through said working chamber and out of said cylinder through the tubular portion of said end cap;
a supporting and sealing unit positionable within said tubular portion and removable from said tubular portion as a single unit, including
a sealing member having an annular sealing portion adapted to surround said piston rod adjacent said piston, said sealing portion including a sealing lip having an upper lip portion and a lower lip portion, said upper and lower lip portions having a U-or V-like cross section, the lower sealing lip making sealing contact with said piston rod and said upper sealing lip making sealing contact with said cylinder end cap, an annular stripper portion axially spaced from said sealing portion on a side of said sealing portion away from said piston and a plurality of circumferentially spaced ribs joining said sealing portion and said stripper portion,
a piston supporting bushing arranged so as to be retained with respect to said sealing member, axially between said sealing and stripper portions the sealing and stripper portions acting as retention holders, and radially between said circumferentially spaced ribs and said piston rod,
at least one lubricant reservoir between said sealing members and between said circumferentially spaced ribs, said reservoir opening onto at least a part of an outer circumferential surface of the supporting bushing said supporting bushing permeable to lubricant at least in a radial direction; and, supporting and sealing unit retention means engageable with said circumferential groove for releasably fixing said supporting sealing unit within said tubular portion.

* * * * *